(12) United States Patent
Yamamoto

(10) Patent No.: US 9,130,490 B2
(45) Date of Patent: Sep. 8, 2015

(54) ROTARY ELECTRIC MACHINE CONTROL APPARATUS AND ELECTRIC POWER STEERING SYSTEM USING THE SAME

(71) Applicant: DENSO CORPORATION, Kariya, Aichi-pref. (JP)

(72) Inventor: Toshihisa Yamamoto, Anjo (JP)

(73) Assignee: DENSO CORPORATION, Kariya (JP)

( * ) Notice: Subject to any disclaimer, the term of this patent is extended or adjusted under 35 U.S.C. 154(b) by 304 days.

(21) Appl. No.: 13/894,044

(22) Filed: May 14, 2013

(65) Prior Publication Data

US 2014/0009094 A1    Jan. 9, 2014

(30) Foreign Application Priority Data

Jul. 4, 2012    (JP) ................................ 2012-150850

(51) Int. Cl.
*H02P 6/08* (2006.01)
*H02P 6/14* (2006.01)
*B62D 5/04* (2006.01)

(52) U.S. Cl.
CPC ................ *H02P 6/14* (2013.01); *B62D 5/0403* (2013.01); *B62D 5/0406* (2013.01); *B62D 5/046* (2013.01)

(58) Field of Classification Search
USPC ............. 318/400.26, 400.27, 400.28, 400.42, 318/488, 489
See application file for complete search history.

(56) References Cited

U.S. PATENT DOCUMENTS 4,957,182 A * 9/1990 Morishita et al. .............. 180/404
6,687,590 B2 * 2/2004 Kifuku et al. ................... 701/43

FOREIGN PATENT DOCUMENTS

JP   07-143735   6/1995
JP   2004-248466   9/2004

OTHER PUBLICATIONS

Office Action (2 pages) dated Apr. 15, 2014, issued in corresponding Japanese Application No. 2012-150850 and English translation (2 pages).

* cited by examiner

*Primary Examiner* — Bentsu Ro
(74) *Attorney, Agent, or Firm* — Nixon & Vanderhye PC

(57) ABSTRACT

Synthesized signal generation circuits are provided to correspond to a U-coil, a V-coil, a W-coil, respectively, and generate synthesized signals by synthesizing a first command signal and a second command signal generated by a command signal generation circuit. CPU output terminals output the synthesized signals. Signal wires are provided with one ends being connected electrically to the CPU output terminals, respectively, and other ends being connected electrically to IC input terminals of a driver IC, respectively. Gate signal generation circuits separate the synthesized signals applied to the IC input terminals to generate first gate signals as gate signals for high-side FETs and second gate signals as gate signals for low-side FETs.

3 Claims, 6 Drawing Sheets

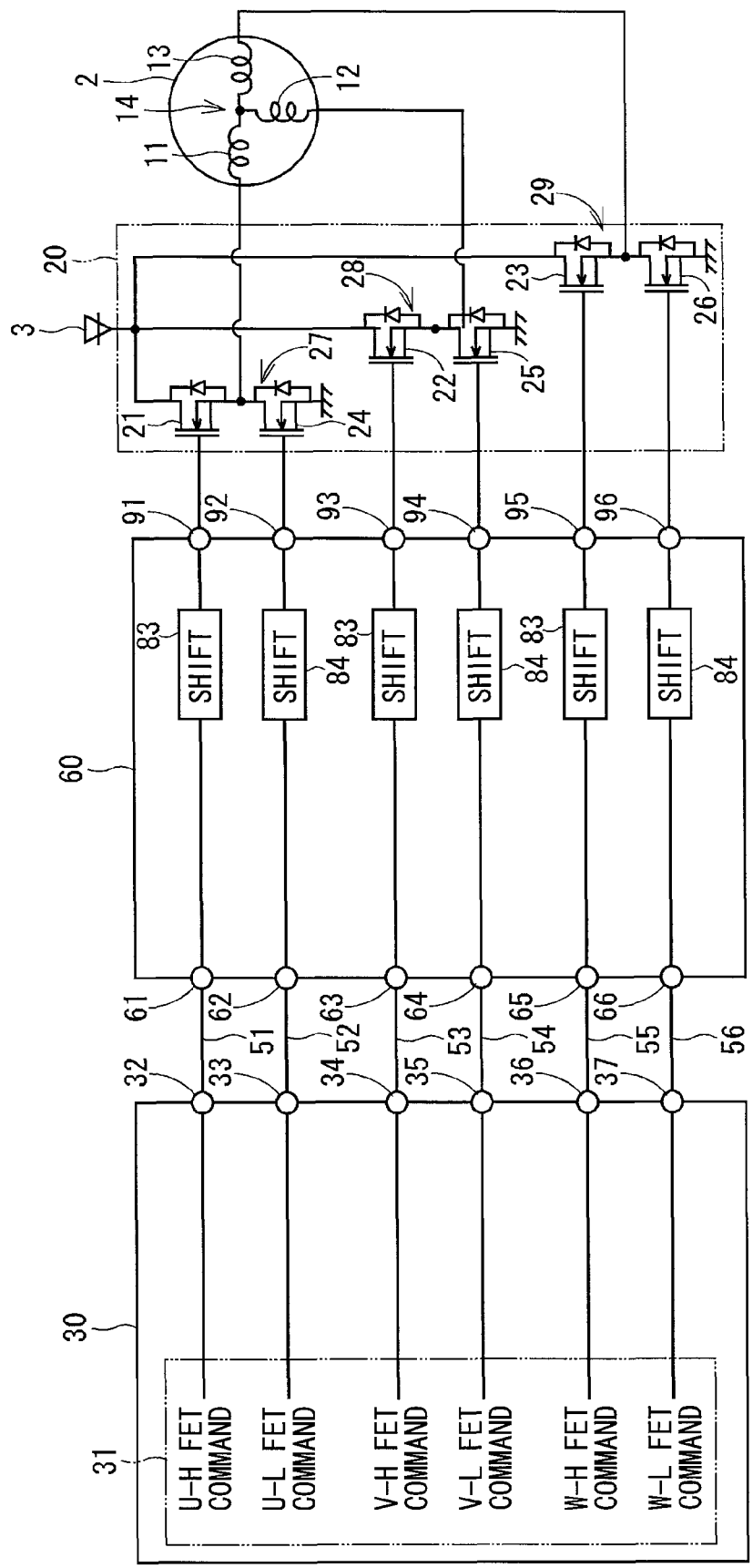
FIG. 4 COMPARATIVE EXAMPLE

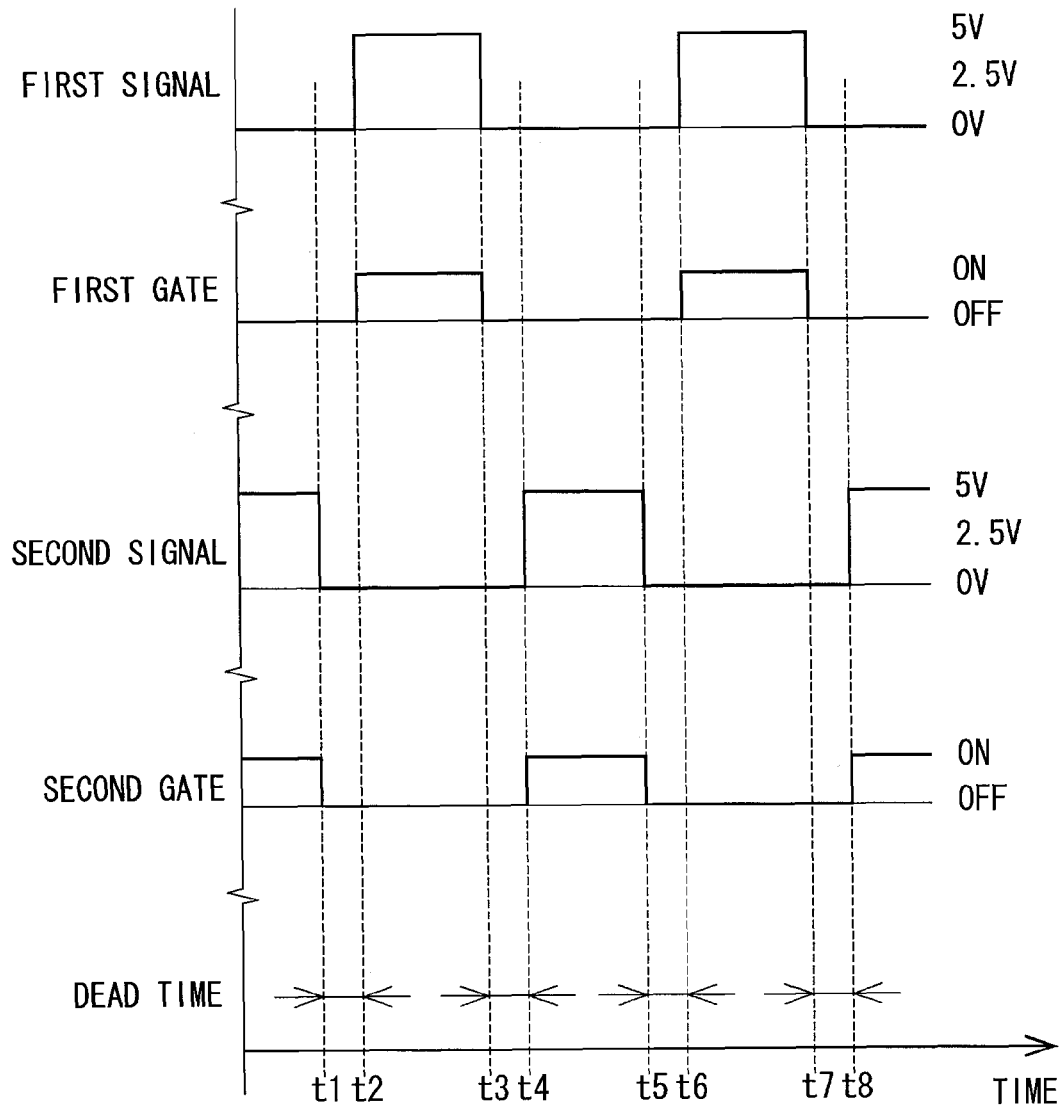

| SECOND COMMAND \ FIRST COMMAND | ON | OFF |
|---|---|---|
| ON | HiZ | Lo |
| OFF | Hi | HiZ |

Hi=5V
HiZ=2.5V
Lo=0V

ROTARY ELECTRIC MACHINE CONTROL APPARATUS AND ELECTRIC POWER STEERING SYSTEM USING THE SAME

CROSS REFERENCE TO RELATED APPLICATION

This application in based on and incorporates herein by reference Japanese patent application No 2012-150850 filed on Jul. 4, 2012.

FIELD

The present disclosure relates to a rotary electric machine control apparatus and an electric power steering system using the same.

BACKGROUND

A conventional rotary electric machine control apparatus controls driving of a rotary electric machine by controlling on/off operations of switching elements of a power conversion device. According to an exemplary rotary electric machine control apparatus disclosed in JP-A-2004-248466 (patent document), a CPU generates command signals for commanding on/off operations of switching elements and a driver IC generates gate signals for the switching elements in correspondence to the command signals. When the gate signals generated by the driver IC are outputted to the gates of the switching elements, the switching elements are turned on and off in response to the gate signals thus rotationally driving the rotary electric machine.

According to the exemplary rotary electric machine control apparatus, a pair of switching elements, that is, a high-side switching element and a low-side switching element, is provided for each phase of multiple-phase coils of the rotary electric machine. The CPU therefore needs to generate command signals for the pair of high-side and low side switching elements, respectively. The CPU generates two command signals for each phase and applies the generated two command signals to a driver IC through the CPU output terminals, signal wires and driver IC input terminals, respectively. As a result, the number of the output terminals, the signal wires and the input terminals between the CPU and the driver IC is doubled relative to the number of phases of the coils. For example, in a case of three phase coils, the numbers of the CPU output terminals, the signal wires and the driver IC input terminals are six, respectively.

In a case of application of the exemplary rotary electric machine control apparatus to an electric power steering system, the rotary electric machine control apparatus need be compact-sized for installation in a limited space. For reducing a size of the rotary electric machine control apparatus, sizes of a CPU and a driver IC need be reduced and areas of a substrate for mounting the CPU and the driver IC thereon need be reduced. In a case of the exemplary rotary electric machine control apparatus, a number of CPU output terminals, signal wires and driver IC input terminals need be provided between the CPU and the driver IC. As a result, reduction of sizes of the CPU and reduction of areas of the substrate for mounting the CPU and the driver IC are limited. It is thus not possible to sufficiently reduce the size of the rotary electric machine control apparatus.

SUMMARY

It is therefore an object to provide a rotary electric machine control apparatus, which has less number of terminals and signal wires between a CPU and a driver IC, and an electric power steering system, which uses the rotary electric machine control apparatus.

According to one aspect, a rotary electric machine control apparatus is provided for driving a rotary electric machine having a coil set formed of plural coils corresponding to plural phases of the rotary electric machine and powered by a power source. The rotary electric machine control apparatus comprises a power converter, a CPU, plural signal wires and a driver IC.

The power converter has switching elements forming plural switching element pairs, which correspond to the plural phases of the rotary electric machine, respectively. Each of the switching element pairs includes a first switching element provided at a high-potential side of the power source and a second switching element provided at a low-potential side of the power source. The power converter converts power supplied form the power source to the rotary electric machine by on/off operations of the first switching element and the second switching element. The CPU includes a command signal generation circuit, plural synthesized signal generation circuits and plural CPU output terminals.

The command signal generation circuit generating, for each phase of the rotary electric machine, a first command signal, which includes a first on-signal or a first off-signal for commanding an on-operation or an off-operation of the first switching element, and a second command signal, which includes a second on-signal or a second off-signal for commanding an on-operation or an off-operation of the second switching element. Each of the synthesized signal generation circuits generate a synthesized signal by synthesizing the first command signal and the second command signal generated by the command signal generation circuit. Each of the CPU output terminals are provided in correspondence to the synthesized signal generation circuit, and outputs the synthesized signal generated by the synthesized signal generation circuit.

The plural signal wires are provided in correspondence to the CPU output terminals, respectively, and have one ends connected to the CPU output terminals.

The driver IC includes plural IC input terminals, plural gate signal generation circuits, plural first IC output terminals and plural second IC output terminals. Each of the IC input terminals is provided in correspondence to the CPU output terminal and connected electrically to an other end of the signal wire to receive the synthesized signal. Each of the gate signal generation circuits generates, by separating the synthesized signal inputted to the IC input terminal, into a first gate signal, which is a gate signal for the first switching element, and a second gate signal, which is a gate signal for the second switching element. The first IC output terminal outputs the first gate signal generated by the gate signal generation circuit. The second IC output terminal outputs the second gate signal generated by the gate signal generation circuit. The driver IC turns on and off the first switching element by outputting the first gate signal from the first IC output terminal to the first switching element, and turns on and off the second switching element by outputting the second gate signal from the second IC output terminal to the second switching element.

BRIEF DESCRIPTION OF THE DRAWINGS

The above and other objects, features and advantages will become more apparent from the following detailed description made with reference to the accompanying drawings. In the drawings:

FIG. 4 is a circuit diagram of a rotary electric machine control apparatus according to a comparative example;

FIG. 5A is a diagram showing a relation between command signals and operations of switching elements in the comparative example;

FIG. 5B is a time chart showing an operation of the rotary electric machine control apparatus according to the comparative example.

DETAILED DESCRIPTION OF EMBODIMENT

Figure 1:
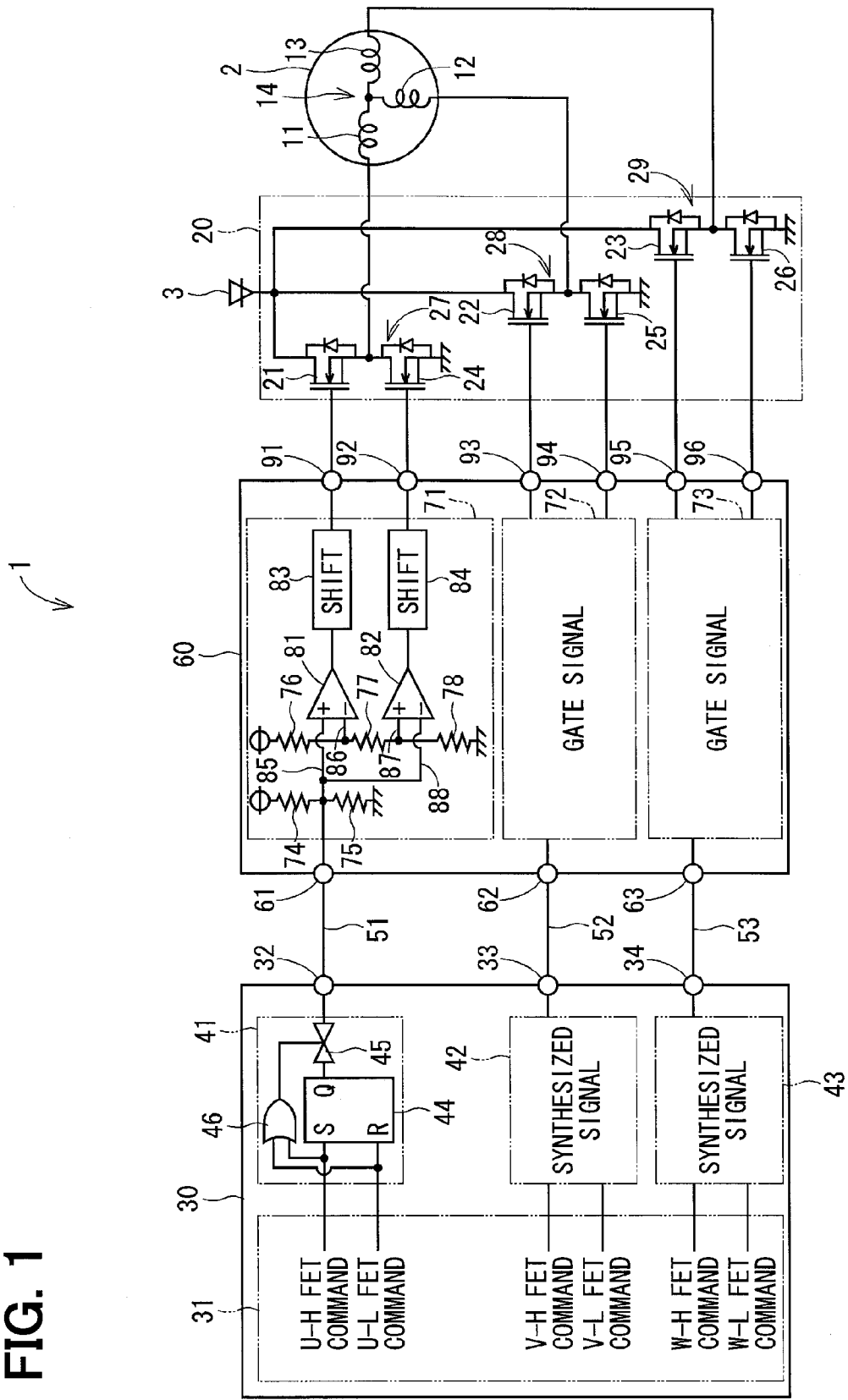
FIG. 1 is a circuit diagram of a rotary electric machine control apparatus according to a first embodiment.

A rotary electric machine control apparatus will be described below with reference to plural embodiments shown in the drawings, in which substantially the same parts are designated by the same reference numerals thereby to simplify the description.

(First Embodiment)

Figure 2:
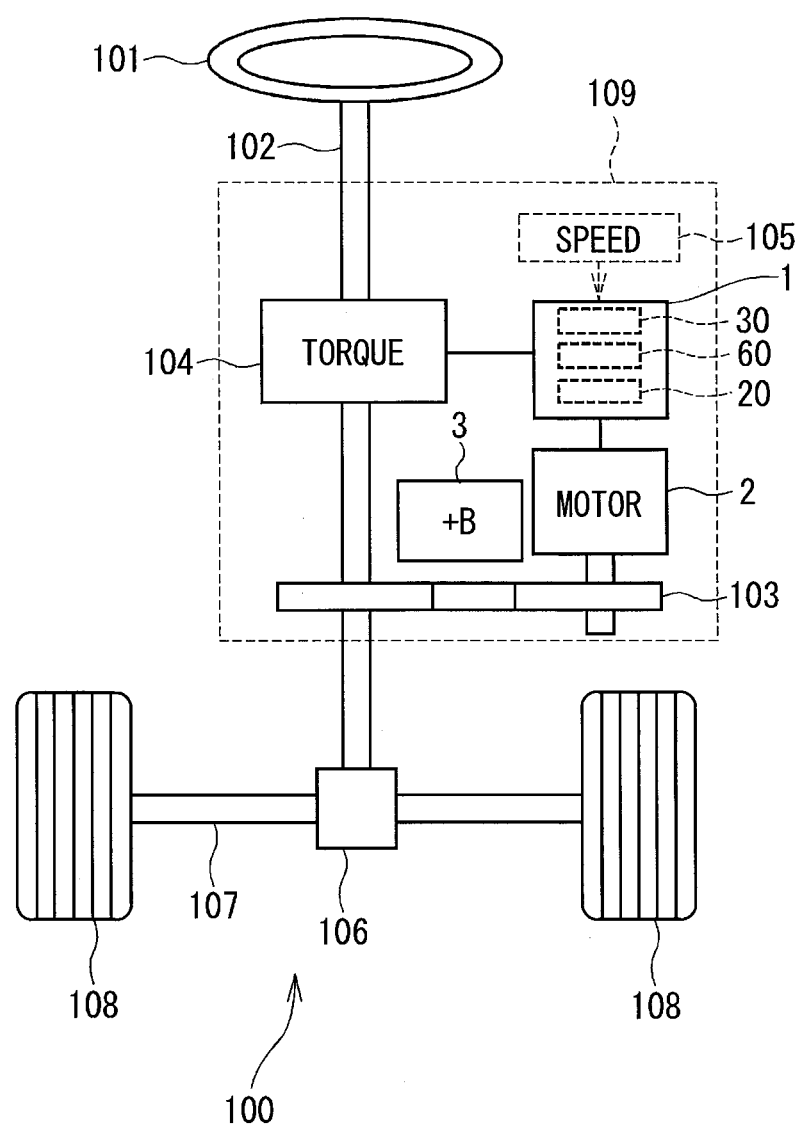
FIG. 2 is a schematic view of an electric power steering system for a vehicle, which uses the rotary electric machine control apparatus according to the first embodiment.

Referring first to FIG. 1, a rotary electric machine control apparatus 1 is configured to control electric power supplied to a motor 2, which is a rotary electric machine, and control driving of the motor 2. The rotary electric machine control apparatus 1 is used in an electric power steering system 109, which assists a steering operation of a vehicle jointly with the motor 2 in a steering system 100, as shown in FIG. 2.

In the electric power steering system 109, a torque sensor 104 is attached to a steering shaft 102 coupled to a steering wheel 101. The torque sensor 104 detects a steering torque, which a driver applies to the steering shaft 102 through the steering wheel 101.

A pinion gear 106 is provided at a top end of the steering shaft 102. The pinion gear 106 is engaged with a rack shaft 107. A pair of tire wheels 108 is rotatably coupled to both ends of the rack shaft 107 through tie rods and the like. When steering wheel 101 is rotated by a driver, the steering shaft 102 coupled to the steering wheel 101 is rotated. The rotary movement of the steering shaft 102 is converted into a linear movement of the rack shaft 107 by the pinion gear 106. The pair of tire wheels 108 is steered by an angle corresponding to a distance of the linear movement of the rack shaft 107.

The electric power steering system 109 is formed of the rotary electric machine control apparatus 1, the motor 2, a battery (+B) 3, a reduction gear 103, the torque sensor 104, a vehicle speed sensor 105, and the like. The motor 2 generates steering assist torque. The rotary electric machine control apparatus 1 controls driving of the motor 2. The reduction gear 103 transfers rotation of the motor 2 to the steering shaft 102 after speed reduction. The motor 2 is a three-phase brushless motor, for example, and includes a rotor and a stator, which are not shown. The rotor is formed cylindrically. Permanent magnets are attached to its surface to provide magnetic poles N and S alternately in the circumferential direction. The stator accommodates and rotatably supports the rotor therein. The stator has protrusions, which protrude in the radially inward direction at every predetermined angular interval in the circumferential direction. The motor 2 has, as shown in FIG. 1, a U-coil 11, a V-coil 12 and a W-coil 13, which are wound about the protrusions. The U-coil 11, the V-coil 12 and the W-coil 13 are windings corresponding to a U-phase, a V-phase and a W-phase, respectively, and forma coil set 14.

The motor 2 is driven by supply of electric power from the battery 3, which is a power source. The motor 2 rotates the reduction gear 103 in a normal direction or an opposite direction. The electric power steering system 109 includes the torque sensor 104 and a speed sensor 105. The electric power steering system 109 generates the steering assist torque based on signals inputted from the torque sensor 104, a vehicle speed sensor 105 and the like, for assisting the steering operation of the steering wheel 101. This assist torque is transferred to the steering shaft 102.

The rotary electric machine control apparatus 1 includes an inverter circuit 20, a CPU 30, signal wires 51, 52, 53, a driver integrated circuit (IC) 60 and the like. The inverter circuit 20 is formed of six switching elements 21 to 26. The inverter circuit 20 is a three-phase inverter provided as a power converter. The switching elements 21 to 26 are connected in a bridge form to switch over power supply to the coil set 14, that is, the U-coil 11, the V-coil 12, the W-coil, respectively. Each of the switching elements 21 to 26 is a metal-oxide-semiconductor field-effect transistor (MOSFET), which is one type of field-effect transistors. The switching elements 21 to 26 will be referred to as FETs 21 to 26.

Drains of three FETs 21 to 23 are connected to a positive side of the battery 3. Sources of the FETs 21 to 23 are connected to drains of the FETs 24 to 26, respectively. Sources of the FETs 24 to 26 are connected to a negative side of the battery 3, that is, grounded. As shown in FIG. 1, a junction between the FET 21 and the FET 24, which are connected in series and paired, is connected to one end of the U-coil 11. A junction between the FET 22 and the FET 25, which are connected in series and paired, is connected to one end of the V-coil 12. A junction between the FET 23 and the FET 26, which are connected in series and paired, is connected to one end of the W-coil 13.

Each of the FETs 21 to 23 is a first switching element in the inverter circuit 20. Each of the FETs 24 to 26 is a second switching element in the inverter circuit 20. The FETs 21 to 23 (first switching elements) are referred to high-side FETs and the FETs 24 to 26 (second switching elements) are referred to as low-side FETs. Further each FET is occasionally defined as, for example, a U-phase Low-side (U-L) FET 24, together with a corresponding phase. In addition, a combination of the FET 21 and the FET 24, a combination of the FET 22 and the FET 25 and a combination of the FET 23 and the FET 26 are referred to as a switching element pair 27, a switching element pair 28 and a switching element pair 29, respectively.

The rotary electric machine control apparatus 1 has one inverter (inverter circuit) 20. The inverter circuit 20 is controlled by a central processing unit (CPU) 30 described later so that electric power supplied from the battery 3 to the motor 2 is converted to rotationally drive the motor 2. The inverter circuit 20 converts electric power supplied from the battery 3 to the motor 2 by on/off operations of the FETs 21 to 26. The CPU 30 is a semiconductor-packaged microcomputer including therein an arithmetic operation unit, a memory unit, an input/output unit and the like. The CPU 30 includes a command signal generation circuit 31, synthesized signal generation circuits 41, 42, 43, CPU output terminals 32, 33, 34 and the like. The command signal generation circuit 31 calculates for each phase a command current for driving the motor 2 based on the signals from the torque sensor 104, the vehicle speed sensor 105 and the like. The command signal generation circuit 31 generates a first command signal and a second command signal for each phase so that the FETs 21 to 26 are driven to allow currents corresponding to the command currents to flow in the U-coil 11, the V-coil 12 and the W-coil 13 of the motor 2. The first command signal includes a first on-signal (ON) or a first off-signal (OFF), which turns on or off the first switching element (FETs 21 to 23). The second command signal includes a second on-signal (ON) or a second off-signal (OFF), which turns on or off the second switching element (FETs 24 to 26). The on/off states of each of the first command signal and the second command signal may be indicated by two (high and low) signal levels.

The command signal generation circuit 31 generates the first command signal and the second command signal, with respect to each phase so that three signal patterns are defined by a combination of the first on-signal or the first off-signal and the second on-signal or the second off-signal. Specifically, one signal pattern (first signal pattern) is defined as a combination of the first on-signal (ON) and the second off-signal (OFF). Another signal pattern (second signal pattern) is defined as a combination of the first off-signal (OFF) and the second on-signal (ON). The other signal pattern (third signal pattern) is defined as a combination of the first off-signal (OFF) and the second off-signal (OFF). The command signal generation circuit 31 does not generate the first command signal and the second command signal, which define a combination of the first on-signal (ON) and the second on-signal (ON). This is because, in each switching element pair 27, 28, 29, the high-side FET and the low-side FET (FET 21 and FET 24, FET 22 and FET 25, FET 23 and FET 26) are never turned on at the same time In the following description, the first command signal and the second command signal are defined as follows:
the first command signal for turning on or off the FET 21 to be a U-phase high-side FET command signal;
the second command signal for turning on or off the FET 24 to be a U-phase low-side FET command signal;
the first command signal for turning on or off the FET 22 to be a V-phase high-side FET command signal;
the second command signal for turning on or off the FET 25 to be a V-phase low-side FET command signal;
the first command signal for turning on or off the FET 23 to be a W-phase high-side FET command signal;
the second command signal for turning on or off the FET 26 to be a W-phase low-side FET command signal;

The synthesized signal generation circuits 41, 42, 43 are provided in correspondence to the U-coil 11, the V-coil 12, the W-coil 13, respectively.

Each synthesized signal generation circuit 41, 42, 43 generates the synthesized signal for the corresponding phase by synthesizing the first command signal and the second command signal generated for the corresponding phase. The synthesized signal generation circuits 41, 42, 43 will be described in detail below. The synthesized signal generation circuit 41 is formed of a flip-flop 44, an analog switch 45, an OR circuit 46 and the like.

The U-phase high-side (U-H) FET command signal generated by the command signal generation circuit 31 is inputted to an input S of the flip-flop 44. The U-phase low-side (U-L) FET command signal generated by the command signal generation circuit 31 is inputted to an input R of the flip-flop 44. With this configuration, the flip-flop 44 outputs a signal (Hi, Lo, HiZ) from its output Q as shown in a table in FIG. 3A. That is, when the U-phase high-side FET command signal (first command signal) is the first on-signal (ON) and the U-phase low-side FET command signal (second command signal) is the second off-signal (OFF), Hi is outputted from the output Q indicating that the flip-flop 44 is in a set-state. When the U-phase high-side FET command signal (first command signal) is the first off-signal (OFF) and the U-phase low-side FET command signal (second command signal) is the second on-signal (ON), a low signal level (Lo) is outputted from the output Q indicating that the flip-flop 44 is in a reset-state. When the U-phase high-side FET command signal (first command signal) is the first off-signal (OFF) and the U-phase low-side FET command signal (second command signal) is the second off-signal (OFF), HiZ is outputted from the output Q. Here, for example, Hi corresponds to a high signal level (5V), Lo corresponds to a low signal level (0V) and HiZ corresponds to open (an intermediate signal level dependent on a voltage of a circuit to be applied).

The analog switch 45 is provided in a signal line, which connects the output Q of the flip-flop 44 and the CPU output terminal 32. The analog switch 45 is turned on and off to connect and disconnect the output Q of the flip-flop 44 and the CPU output terminal 32 electrically, respectively. The OR circuit 46 is a logical sum circuit, two inputs of which are connected to signal lines of the first command signal and the second command signal, an output of which is connected to the analog switch 45. With this configuration, the OR circuit 46 outputs an on-signal (ON) and an off-signal (OFF), when at least one of the two inputs (first command signal and second command signal) is the on-signal (ON) and both of the two inputs are the off-signal (OFF), respectively.

The analog switch 45 is turned on and off by the signal (on-signal and of signal) outputted from the OR circuit 46. That is, when the output of the OR circuit 46 is the on-signal, the analog switch 45 is turned on to permit electric connection between the output Q of the flip-flop 44 and the CPU output terminal 32. On the other hand, when the output of the OR circuit 46 is the off-signal, the analog switch 45 is turned of to interrupt electric connection between the output Q of the flip-flop 44 and the CPU output terminal 32 With the above-described configuration, the synthesized signal generation circuit 41 (analog switch 45) outputs the synthesized signal (Hi, Lo, HiZ). Thus, the synthesized signal generation circuit 41 generates the synthesized signal by synthesizing the first command signal and the second command signal generated by the command signal generation circuit 31.

Since the synthesized signal generation circuits 42 and 43 are configured similarly to the synthesized signal generation circuit 41, respective internal configuration is not shown nor described in detail. Each of the synthesized signal generation circuits 42 and 43 has, similarly to the synthesized signal generation circuit 41, a flip-flop 44, an analog switch 45, an OR circuit 46 and the like. The synthesized signal generation circuit 42 receives the V-phase high-side FET command signal and the V-phase low-side FET command signal generated by the command signal generation circuit 31 and generates a synthesized signal (Hi, Lo, HiZ). The synthesized signal generation circuit 43 receives the W-phase high-side FET command signal and the W-phase low-side FET command signal generated by the command signal generation circuit 31 and generates a synthesized signal (Hi, Lo, HiZ).

The CPU output terminals 32, 33, 34 are provided in correspondence to the synthesized signal generation circuits 41, 42, 43, respectively. The CPU output terminals 32, 33, 34 output the synthesized signals (Hi, Lo, HiZ) generated by the synthesized signal generation circuits 41, 42, 43, respectively. Signal wires 51, 52, 53 are metal conductors such as copper, for example, and provided in correspondence to the CPU output terminals 32, 33, 34, respectively. One ends of the signal wires 51, 52, 53 are connected electrically to the CPU output terminals 32, 33, 34, respectively.

The driver IC 60 has IC input terminals 61, 62, 63, gate signal generation circuits 71, 72, 73, first IC output terminals 91, 93, 95, second IC output terminals 92, 94, 96, and the like. The IC input terminals 61, 62, 63 are provided in correspondence to the CPU output terminals 32, 33, 34, respectively. To the IC input terminals 61, 62, 63, the other ends of the signal wires 51, 52, 53 are electrically connected, respectively. To the IC input terminals 61, 62, 63, the synthesized signals (Hi, Lo, HiZ) are inputted from the CPU output terminals 32, 33 34 through the signal wires 51, 52, 53, respectively.

The gate signal generation circuits 71, 72, 73 divide the synthesized signals inputted to the IC input terminals 61, 62, 63 into the first gate signals, which are gate signals for the first switching elements (FETs 21, 22, 23), and the second gate signals, which are gate signals for the second switching elements (FETs 24, 25, 26), respectively. The gate signal generation circuits 71, 72, 73 will be described in detail below. The gate signal generation circuit 71 is formed of resistors 74 to 78, comparators 81, 82, level shift circuits 83, 84 and the like.

The resistors 74 and 75 are connected in series. A voltage of, for example, 5V is applied to the resistor 74 at a high-potential side, which is opposite to a low-potential side connected to the resistor 75. The resistor 75 is grounded at a low-potential side opposite to a high-potential side, which is connected to the resistor 74. The resistors 76, 77, 78 are connected in series in this order. A voltage of, for example, 5V is applied to the resistor 76 at a side opposite to the resistor 77. The resistor 78 is grounded at the side opposite to the resistor 77.

Each of the comparators 81, 82 outputs a signal Hi, when a voltage applied to its non-inverting input (+) is higher than that applied to its inverting input (−). Each of the comparators 81, 82 outputs a signal Lo, when the voltage applied to the non-inverting input (+) is lower than that applied to the inverting input (−). The non-inverting input (+) of the comparator 81 and the IC input terminal 61 are connected electrically by an input line 85. A junction between the resistor 74 and the resistor 75 is connected electrically to the input line. A junction between the resistor 76 and the resistor 77 is connected electrically to the inverting input (−) of the comparator 81 through an input line 86. A junction between the resistor 77 and the resistor 78 is connected electrically to the non-inverting input (+) of the comparator 82 through an input line 87. The input line 85 and the inverting input (−) of the comparator 82 are connected electrically by an input line 88.

Resistance values of the resistor 74 and the resistor 75 are set to the same value. As a result, the voltage at the junction between the resistor 74 and the resistor 75 is 2.5V. Resistance values of the resistors 76, 77, 78 are set such that a voltage at the junction between the resistors 76 and 77 is, for example, threshold voltage 4.5V for the comparator 81, and a voltage at the junction between the resistors 77 and 78 is, for example, threshold voltage 1.5V for the comparator 82. The level shift circuits 83, 84 are provided to be connected to outputs of the comparators 81, 82, respectively. The level shift circuit 83 outputs the first gate signal (ON, OFF), which is the gate signal for the first switching element (U-phase high-side FET 21), based on a signal (Hi, Lo) inputted from the comparator 81. For example, the level shift circuit 83 outputs the first gate signal ON and the first gate signal OFF, when the signal Hi and the signal Lo are inputted from the comparator 81, respectively. The level shift circuit 84 outputs the second gate signal (ON, OFF), which is the gate signal for the second switching element (U-phase low-side FET 24), based on a signal (Hi, Lo) inputted from the comparator 82. For example, the level shift circuit 84 outputs the second gate signal ON and the second gate signal OFF, when the signal Hi and the signal Lo are inputted from the comparator 82, respectively.

When the synthesized signal (Hi: 5V) is inputted from the CPU output terminal 32 to the IC input terminal 61 through the signal wire 51, the signal Hi is outputted from the output of the comparator 81 of the gate signal generation circuit 71 and the first gate signal ON is outputted from the level shift circuit 83. The signal Lo is outputted from the output of the comparator 82 and the second gate signal OFF is outputted from the level shift circuit 84. When the synthesized signal (Lo: 0V) is inputted from the CPU output terminal 32 to the IC input terminal 61 through the signal wire 51, the signal Lo is outputted from the output of the comparator 81 of the gate signal generation circuit 71 and the first gate signal OFF is outputted from the level shift circuit 83. The signal Hi is outputted from the output of the comparator 82 and the second gate signal ON is outputted from the level shift circuit 84. When the synthesized signal (HiZ: 2.5V) is inputted from the CPU output terminal 32 to the IC input terminal 61 through the signal wire 51, the signal Lo is outputted from the output of the comparator 81 of the gate signal generation circuit 71 and the first gate signal OFF is outputted from the level shift circuit 83. The signal Lo is outputted from the output of the comparator 82 and the second gate signal OFF is outputted from the level shift circuit 84.

Since the gate signal generation circuits 72 and 73 are configured similarly to the gate signal generation circuit 71, respective internal configuration is not shown nor described in detail. The gate signal generation circuits 72, 73 are formed of, similarly to the gate signal generation circuit 71, resistors 74 to 78, comparators 81, 82, level shift circuits 83, 84 and the like, respectively. The gate signal generation circuit 72 receives the synthesized signal (Hi, Lo, HiZ) form the IC input terminal 62 and outputs the first gate signal (ON, OFF) for the first switching element (V-phase high-side FET 22) and the second gate signal (ON, OFF) for the second switching element (V-phase low-side FET 25). The gate signal generation circuit 73 receives the synthesized signal (Hi, Lo, HiZ) form the IC input terminal 63 and outputs the first gate signal (ON, OFF) for the first switching element (W-phase high-side FET 23) and the second gate signal (ON, OFF) for the second switching element (W-phase low-side FET 26).

The first IC output terminals 91, 93, 95 are provided to be connected electrically to the level shift circuit 83 of the gate signal generation circuits 71, 72, 73, respectively. Thus the first IC output terminals 91, 93, 95 output the first gate signals (ON, OFF) generated by the gate signal generation circuits 71, 72, 73, respectively. The second IC output terminals 92, 94, 96 are provided to be connected electrically to the level shift circuit 84 of the gate signal generation circuits 71, 72, 73, respectively. Thus the second IC output terminals 92, 94, 96 output the second gate signals (ON, OFF) generated by the gate signal generation circuits 71, 72, 73, respectively. The driver IC 60 outputs the first gate signals (ON, OFF) to the gates of the first switching elements (U-phase high-side FET 21, V-phase high-side FET 22, W-phase high-side FET 23) from the first IC output terminals 91, 93, 95, respectively, thereby to turn on and off the first switching elements (U-phase high-side FET 21, V-phase high-side FET 22, W-phase high-side FET 23). The driver IC 60 outputs the second gate signals (ON, OFF) to the gates of the second switching elements (U-phase low-side FET 24, V-phase low-side FET 25, W-phase low-side FET 26) from the second IC output terminals 91, 93, 95, respectively, thereby to turn on and of the second switching elements (U-phase low-side FET 24, V-phase low-side FET 25, W-phase low-side FET 26).

Figures 3A, 3B:
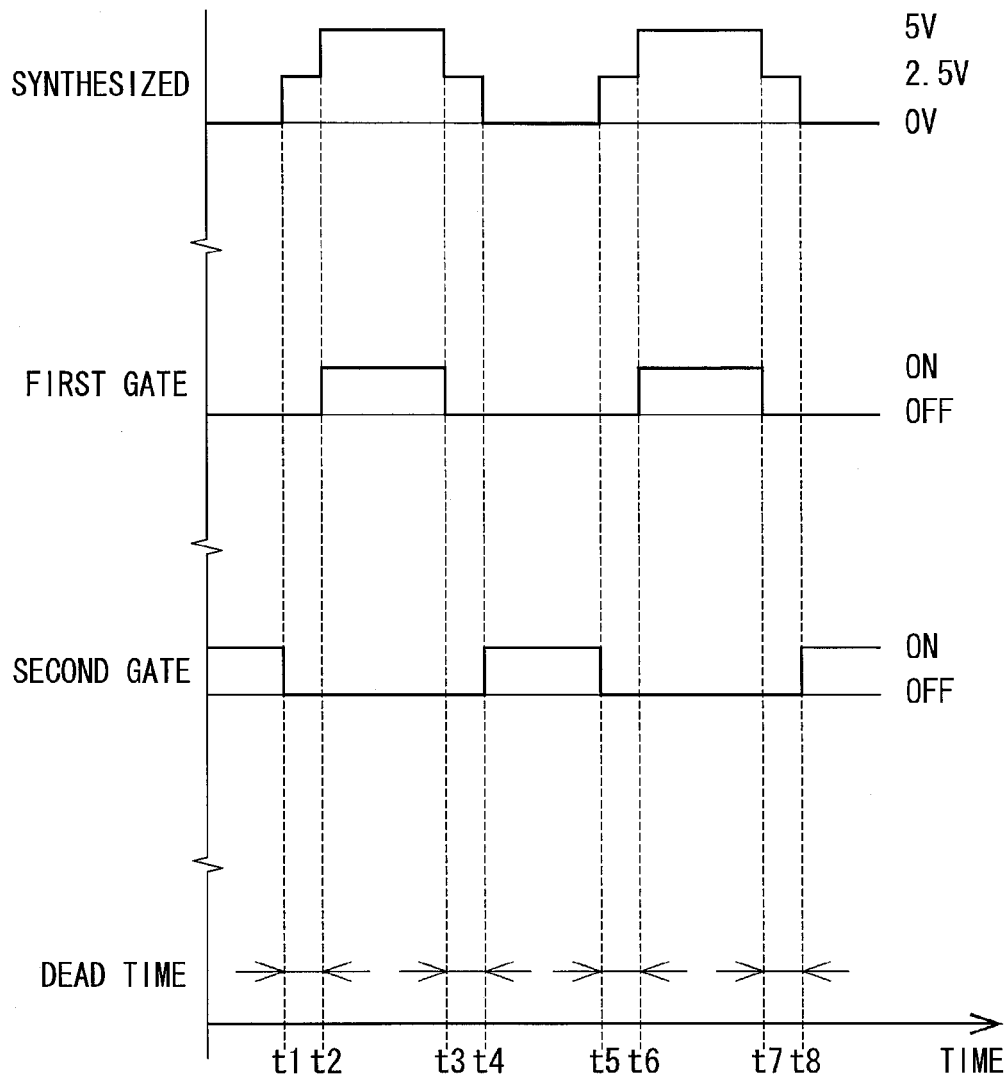
FIG. 3A is a diagram showing a relation between command signals and operations of switching elements in the first embodiment.
FIG. 3B is a time chart showing an operation of the rotary electric machine control apparatus according to the first embodiment.

One exemplary operation of the rotary electric machine control apparatus 1 will be described with reference to FIG. 3B, which shows time changes of the synthesized signal applied to the IC input terminal 61 of the driver IC 60, the first gate signal outputted from the IC output terminal 91 of the driver IC 60 and applied to the gate of the U-phase high-side FET 21, the second gate signal outputted from the IC output terminal 92 of the driver IC 60 and applied to the gate of the U-phase low-side FET 24, and a dead time described later in detail. Since the synthesized signal is Lo (0V) before time t1, during a period from time t4 to time t5 and after time t8, the first gate signal is OFF and the second gate signal is ON. As a result, the U-phase high-side FET 21 is turned of (off-state) and the U-phase low-side FET 24 is turned on (on-state). Since the synthesized signal is HiZ (2.5V) during periods from time t1 to time t2, from time t3 to time t4, from time t5 to time t6 and from time t7 to time t8, the first gate signal and the second gate signal are both OFF. As a result, the U-phase high-side FET 21 and the U-phase low-side FET 24 are both turned off (off-state). This period is referred to as the dead time Since the synthesized signal is Hi (5V) during periods from time t2 to time t3 and from time t6 to time t7, the first gate signal is ON and the second gate signal is OFF. As a result, the U-phase high-side FET 21 is turned on (on-state) and the U-phase low-side FET 24 is turned off (off-state). Although the operation of only the U-phase switching elements (U-phase high-side FET 21 and U-phase low-side FET 24) is described, the switching elements of other phases (V-phase high-side FET 22, V-phase low-side FET 25, W-phase high-side FET 23, W-phase low-side FET 26) operate similarly. As described above, the dead time is provided for each of the switching element pairs 27, 28, 29 in the operations of the switching elements (FET 21 to 26). Thus it is possible to control the motor 2 with high precision while suppressing torque ripples of the motor 2.

first embodiment described above will be compared with a comparative example shown in FIG. 4. The rotary electric machine control apparatus according to the comparative example is formed of, similarly to the first embodiment, an inverter circuit 20, a CPU 30, a driver IC 6 and the like. In the comparative example, however, differently from the first embodiment, the CPU 30 is not provided with synthesized signal generation circuits 41, 42, 43. Further, although the driver IC 60 includes gate signal generation circuits 71, 72, 73, the gate signal generation circuits 71, 72, 73 are not provided with resistors 74 to 78 and comparators 81, 82.

Differently from the first embodiment, the CPU 30 in the comparative example has six CPU output terminals 32 to 37. Further, the driver IC 60 in the comparative example has six IC input terminals 61 to 66. The CPU output terminals 32 to 37 and the IC input terminals 61 to 66 are connected electrically through six signal wires 51 to 56, respectively. In the comparative example, a U-phase high-side FET command signal (first command signal: ON, OFF) and a U-phase low-side FET command signal (second command signal: ON, OFF) generated by a command signal generation circuit 31 are outputted from the CPU output terminals 32, 33 as they are, respectively, without synthesizing. The U-phase high-side FET command signal (first command signal) and the U-phase low-side FET command signal (second command signal) outputted from the CPU output terminals 32 and 33 are inputted to the IC input terminals 61 and 62 through the signal wires 51 and 52, respectively. Assuming that the signals inputted to the IC input terminals 61 and 62 are a first signal and a second signal, the first signal and the second signal become Hi (for example 5V) and Lo (for example, 0V) in correspondence to the first command signal (ON, OFF) and the second command signal (ON, OFF), respectively.

The level shift circuit 83 of the gate signal generation circuit 71 outputs the first gate signal (ON, OFF) to the IC output terminal 91, when the first signal (Hi, Lo) is inputted from the IC input terminal 61. When the first gate signal (ON, OFF) is outputted from the IC output terminal 91 to the gate for the U-phase high-side FET 21, the U-phase high-side FET 21 turns on and off. The level shift circuit 84 of the gate signal generation circuit 71 outputs the second gate signal (ON, OFF) to the IC output terminal 92, when the second signal (Hi, Lo) is inputted from the IC input terminal 62. When the second gate signal (ON, OFF) is outputted from the IC output terminal 92 to the gate for the U-phase low-side FET 24, the U-phase low-side FET 24 turns on and off.

Similarly, when the command signal generation circuit 31 generates the V-phase high-side FET command signal (ON, OFF) and the V-phase low-side FET command signal (ON, OFF), the first gate signal (ON, OFF) is outputted to the gate of the V-phase high-side FET 22 to turn the V-phase high-side FET 22. The second gate signal (ON, OFF) is outputted to the gate of the V-phase low-side FET 25 to turn on and off the V-phase low-side FET 25. Similarly, when the command signal generation circuit 31 generates the W-phase high-side FET command signal (ON, OFF) and the W-phase low-side FET command signal (ON, OFF), the first gate signal (ON, OFF) is outputted to the gate of the W-phase high-side FET 23 to turn the W-phase high-side FET 23. The second gate signal (ON, OFF) is outputted to the gate of the W-phase low-side FET 26 to turn on and off the W-phase low-side FET 26.

One exemplary operation of the rotary electric machine control apparatus according to the comparative example is shown in FIG. 5A and FIG. 5B. The above-described relation among the signals and on/off operations of the switching elements are summarized in a table in FIG. 5A. FIG. 5B shows time changes of the first signal applied to the IC input terminal 61 of the driver IC 60, the first gate signal outputted from the IC output terminal 91 of the driver IC 60 and applied to the gate of the U-phase high-side FET 21, the second signal applied to the IC input terminal 62 of the driver IC 60, the second gate signal outputted from the IC output terminal 92 of the driver IC 60 and applied to the gate of the U-phase low-side FET 24, and a dead time Since the first signal is Lo (0V) and the second signal is Hi (5V) before time t1, during a period from time t4 to time t5 and after time t8, the first gate signal is OFF and the second gate signal is ON. As a result, the U-phase high-side FET 21 is turned off (off-state) and the U-phase low-side FET 24 is turned on (on-state). Since the first signal and the second signal are both Lo (0V) during periods from time t1 to time t2, from time t3 to time t4, from time t5 to time t6 and from time t7 to time t8, the first gate signal and the second gate signal are both OFF. As a result, the U-phase high-side FET 21 and the U-phase low-side FET 24 are both turned off (off-state). This period is referred to as the dead time Since the first signal is Hi (5V) and the second signal is Lo (0V) during periods from time t2 to time t3 and from time t6 to time t7, the first gate signal is ON and the second gate signal is OFF. As a result, the U-phase high-side FET 21 is turned on (on-state) and the U-phase low-side FET 24 is turned off (off-state). Although the operation of the U-phase switching elements (U-phase high-side FET 21 and U-phase low-side FET 24) is described, the switching elements of other phases (V-phase high-side FET 22, V-phase low-side FET 25, W-phase high-side FET 23, W-phase low-side FET 26) operate similarly.

As described above, according to the comparative example, six CPU output terminals 32 to 37, six signal wires 51 to 56 and six IC input terminals 61 to 66, that is, two for one phase of the motor 2, are needed for applying signals, which are related to on/off operations of the first switching elements (FETs 21 to 23) and the second switching elements (FETs 24 to 26), from the CPU 30 to the driver IC 60. According to the first embodiment described above, however, only three CPU output terminals 32 to 34, three signal wires 51 to 53 and three IC input terminals 61 to 63, that is, only one for each phase, are needed between the CPU 30 and the driver IC 60. For this reason, the first embodiment is more advantageous than the comparative example, in that the size of the CPU 30 and the driver IC 60 and the area of the substrate needed to mount the CPU 30 and the driver IC 60 is reduced.

As described above, the first embodiment has the following features.

(1) Each of the synthesized signal generation circuits 41, 42, 43 of the CPU 30 generates the synthesized signal (Hi, Lo, HiZ) by synthesizing the first command signal (ON, OFF) and the second command signal (ON, OFF). Each of the gate signal generation circuits 71, 72, 73 of the driver IC 60 generates the first gate signal (ON, OFF) and the second gate signal (ON, OFF) by separating the synthesized signal so that the first switching element (FETs 21 to 23) and the second switching element (FETs 24 to 26) are turned on and off. As a result, in applying the signals related to on/off operations of the first switching element and the second switching element from the CPU 30 to the driver IC 60, the numbers of the CPU output terminals (32, 33, 34), the signal wires (51, 52, 53) and the IC input terminals (61, 62, 63) between the CPU 30 and the driver IC 60 are reduced to the same number as the number of the phases of the coil. Thus the numbers of the output terminals, the signal wires and the input terminals can be reduced in comparison to the conventional rotary electric machine control apparatus and the rotary electric machine control apparatus of the comparative example, both of which require two input terminals, two signal wires and two output terminals for each phase of the coil of the motor. As a result, the size of the CPU 30 and the driver IC 60 and the area of the substrate needed to mount the CPU 30 and the driver IC 60 can be reduced. The rotary electric machine control apparatus 1 can be reduced in size.

(2) The command signal generation circuit 31 generates the first command signal and the second command signal so that the pattern of combination of the first off-signal (OFF) and the second off-signal (OFF), which is one of patterns of combinations of the first on-signal (ON) or the first off-signal (OFF) and the second on-signal (ON) or the second off-signal (OFF), is included in the predetermined period. That is, the dead time is provided for each of the switching element pairs 27, 28, 29 in respect to operations of the switching elements (FETs 21 to 26). Thus it is possible to control the motor 2 with high precision while suppressing torque ripples.

(3) The command signal generation circuit 31 generates the first command signal and the second command signal so that the patterns of combinations of the first on-signal (ON) or the first off-signal (OFF) and the second on-signal (ON) or the second off-signal (OFF) include three patterns. One pattern is the combination of the first on-signal (ON) and the second off-signal (OFF). Another pattern is the combination of the first off-signal (OFF) and the second on-signal (ON). The other pattern is the combination of the first off-signal (OFF) and the second off-signal (OFF). That is, the command signal generation circuit 31 does not generate the first command signal and the second command signal, which correspond to the combination of the first on-signal (ON) and the second on-signal (ON). This is because the high-side FET and the low-side FET (FETs 21 and 24, FETs 22 and 25, FETs 23 and 26) are not turned on at the same time in each switching element pair.

(4) The command signal generation circuit 31 generates the first command signal and the second command signal in the combination pattern of the first off-signal (OFF) and the second off-signal (OFF). As a result, the dead time can be provided in the operations of the first switching elements (FETs 21 to 23) and the second switching elements (FETs 24 to 26). The dead time is a period required for suppressing torque ripples of the motor 2 in the rotary electric machine control apparatus 1, which controls the motor 2 of the electric power steering system 109. The rotary electric machine control apparatus 1 is configured such that the command signal generation circuit 31 generates the first command signal and the second command signal in the pattern of combination of the first off-signal (OFF) and the second off-signal (OFF). Thus the rotary electric machine control apparatus 1 can be used for the electric power steering system 109 appropriately.

(Second Embodiment)

A rotary electric machine control apparatus according to a second embodiment will be described with reference to FIG. 6A and FIG. 6B. The second embodiment is different from the first embodiment in respect of the internal configuration of a CPU 30.

According to the second embodiment, as shown in FIG. 6, a synthesized signal generation circuit 41 in the CPU 30 includes a flip-flop 44, an analog switch 45 and an exclusive-OR (XOR) circuit 47. That is, in the second embodiment, the OR circuit 46 of the synthesized signal generation circuit 41 in the first embodiment is replaced with the XOR circuit 47. Synthesized signal generation circuits 42 and 43 similarly have flip-flops 44, analog switches 45 and XOR circuits 47, respectively. The XOR circuit 47 outputs an on-signal (ON) when either one of two inputs (first command signal and second command signal) is an on-signal (ON), and outputs an off-signal (OFF) when both of two inputs are on-signals (ON) or off-signals (OFF).

The command signal generation circuit 31 generates a first command signal and a second command signal so that patterns of combinations of a first on-signal (ON) or a first off-signal (OFF) and a second on-signal (ON) or a second off-signal (OFF) include four patterns. One pattern is the combination of the first on-signal (ON) and the second on-signal (ON). Another pattern is the combination of the first on-signal (ON) and the second off-signal (OFF). A further pattern is the combination of the first off-signal (OFF) and the second on-signal (ON). The other pattern is the combination of the first off-signal (OFF) and the second off-signal (OFF). The command signal generation circuit 31 generates, differently from the first embodiment, the first command signal and the second command signal, which correspond to a pattern of combination of the first on-signal (ON) and the second on-signal (ON).

Figures 6A, 6B:
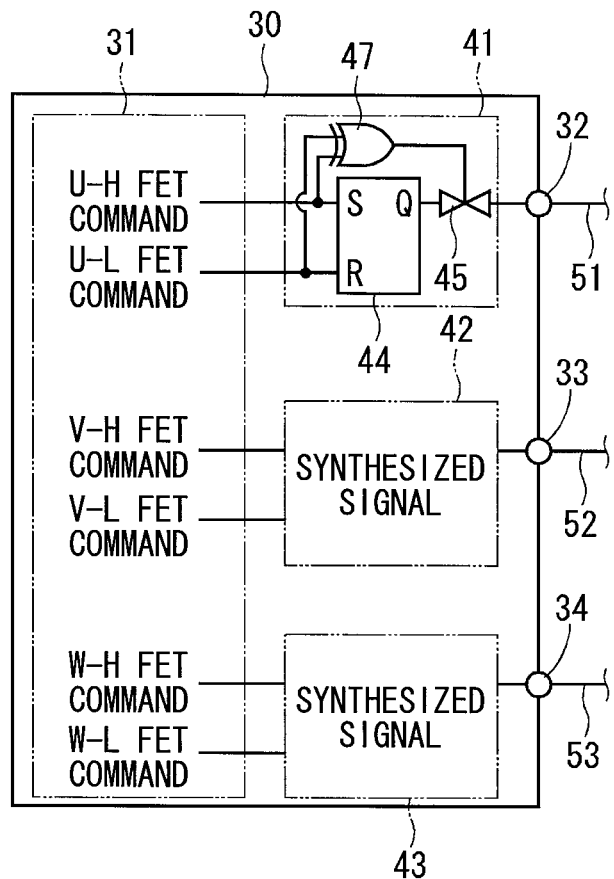
FIG. 6A is a circuit diagram of a part of a rotary electric machine control apparatus according to a second embodiment.
FIG. 6B is a diagram showing a relation between command signals and operations of switching elements in the second embodiment.

Since each of the synthesized signal generation circuits 41, 42, 43 has the XOR circuit 47, each of the synthesized signal generation circuits 41, 42, 43 generates the synthetic signal HiZ (open) as shown in FIG. 6B when the command signal generation circuit 31 generates the first command signal and the second command signal, which result in the pattern of combination of the first on-signal (ON) and the second on-signal (ON). When the command signal generation circuit 31 generates the first command signal and the second command signal, which result in the pattern of combination of the first on-signal (ON) and the second on-signal (ON), both the first switching element (FETs 21 to 23) and the second switching element (FETs 24 to 26) are turned off (off-state). This period corresponds to the dead time.

As described above, the rotary electric machine control apparatus having the same function (function of controlling the switching elements with high precision) can be realized by providing the XOR circuits 47 in the synthesized signal generation circuits 41, 42, 43, even in a case that the command signal generation circuit 31 generates the first command signal and the second command signal so that the patterns of combinations of the first on-signal (ON) or the first off-signal (OFF) and the second on-signal (ON) or the second off-signal (OFF) include four patterns. The four patterns are the combination of the first on-signal (ON) and the second on-signal (ON), the combination of the first on-signal (ON) and the second off-signal (OFF), the combination of the first off-signal (OFF) and the second on-signal (ON), and the combination of the first off-signal (OFF) and the second off-signal (OFF). In addition the rotary electric machine control apparatus can be realized to provide the same advantage (reduction in number of output terminals, signal wires and input terminals, as well as reduction in size of CPU 30 and driver IC 60).

(Other Embodiment)

The above-described embodiments are exemplified as the rotary electric machine control apparatus applied to the three-phase brushless motor. As other embodiment, the rotary electric machine control apparatus may be applied to a brushless motor, which has coils corresponding to two phases or four or more phases. In this embodiment, the number of CPU output terminals, signal wires and IC input terminals between a CPU and a driver IC can be made to equal the number of phases of coils.

As other embodiment, the rotary electric machine control apparatus may be applied to a motor with brushes having coils corresponding to plural terminals. In this embodiment, the number of CPU output terminals, signal wires and IC input terminals between a CPU and a driver IC can be made to equal the number of terminals of the coils. The rotary electric machine control apparatus may control a rotary electric machine (motor and generator) other than the rotary electric machine for the electric power steering system. Thus the rotary electric machine control apparatus is not limited to the disclosed embodiments but may be implemented in other various embodiments.

What is claimed is:

1. A rotary electric machine control apparatus for driving a rotary electric machine having a coil set formed of plural coils corresponding to plural phases or terminals of the rotary electric machine, the rotary electric machine control apparatus comprising:
    a power converter having switching elements forming plural switching element pairs, which correspond to the plural phases or terminals of the rotary electric machine, respectively,
    each of the switching element pairs including a first switching element provided at a high-potential side of a power source and a second switching element provided at a low-potential side of the power source, and
    the power converter converting power supplied form the power source to the rotary electric machine by on/off operations of the first switching element and the second switching element;
    a CPU including a command signal generation circuit, plural synthesized signal generation circuits and plural CPU output terminals,
    the command signal generation circuit generating, for each phase of the rotary electric machine, a first command signal, which includes a first on-signal or a first off-signal for commanding an on-operation or an off-operation of the first switching element, and a second command signal, which includes a second on-signal or a second off-signal for commanding an on-operation or an off-operation of the second switching element,
    each of the synthesized signal generation circuits generating a synthesized signal by synthesizing the first command signal and the second command signal generated by the command signal generation circuit, and
    each of the CPU output terminals provided in correspondence to the synthesized signal generation circuit, and outputting the synthesized signal generated by the synthesized signal generation circuit;
    plural signal wires provided in correspondence to the CPU output terminals, respectively, and having one ends connected to the CPU output terminals; and
    a driver IC including plural IC input terminals, plural gate signal generation circuits, plural first IC output terminals and plural second IC output terminals,
    each of the IC input terminals provided in correspondence to the CPU output terminal and connected electrically to an other end of the signal wire to receive the synthesized signal,
    each of the gate signal generation circuits generating, by separating the synthesized signal inputted to the IC input terminal, into a first gate signal, which is a gate signal for the first switching element, and a second gate signal, which is a gate signal for the second switching element,
    the first IC output terminal outputting the first gate signal generated by the gate signal generation circuit,
    the second IC output terminal outputting the second gate signal generated by the gate signal generation circuit, and
    the driver IC turning on and off the first switching element by outputting the first gate signal from the first IC output terminal to the first switching element, and turning on and off the second switching element by outputting the second gate signal from the second IC output terminal to the second switching element,
    wherein the command signal generation circuit generates the first command signal and the second command signal so that patterns of combinations of the first on-signal or the first off-signal and the second on-signal or the second off-signal are defined to three patterns of a combination of the first on-signal and the second off-signal, a combination of the first off-signal and the second on-signal and a combination of the first off signal and the second off-signal.

2. The rotary electric machine control apparatus according to claim 1, wherein:
    the command signal generation circuit generates the first command signal and the second command signal so that a pattern of combination of the first off-signal and the second off-signal, which is one of patterns of combinations of the first on-signal or the first off-signal and the second on-signal or the second off-signal, is included in a predetermined period.

3. An electric power steering system comprising:
the rotary electric machine control apparatus according to claim 1; and
the rotary electric machine outputting assist torque related to a steering operation of the vehicle.

\* \* \* \* \*